United States Patent [19]

Richardson et al.

[11] Patent Number: 4,548,785
[45] Date of Patent: Oct. 22, 1985

[54] STUB TUBE INSPECTION DEVICE

[75] Inventors: David L. Richardson, Los Gatos; Peter M. Patterson, Livermore; Jack P. Clark, San Jose; Scott R. Stanton, San Jose; Richard W. Perry, San Jose, all of Calif.

[73] Assignee: General Electric Company, San Jose, Calif.

[21] Appl. No.: 449,651

[22] Filed: Dec. 14, 1982

[51] Int. Cl.⁴ .............................................. G21C 17/00
[52] U.S. Cl. ..................................... 376/249; 376/252
[58] Field of Search .............. 376/249, 252; 165/11 A

[56] References Cited

U.S. PATENT DOCUMENTS

| | | | |
|---|---|---|---|
| 3,934,457 | 1/1976 | Clark et al. | 376/249 |
| 3,988,922 | 11/1976 | Clark et al. | 376/249 |
| 4,010,636 | 3/1977 | Clark et al. | 73/637 |
| 4,018,345 | 4/1977 | Formanek et al. | 165/11 A |
| 4,205,940 | 6/1980 | Golick | 165/11 A |
| 4,368,644 | 1/1983 | Wentzell et al. | 376/249 |
| 4,394,345 | 7/1983 | De Briere et al. | 376/249 |
| 4,452,753 | 6/1984 | Wentzell et al. | 376/249 |

FOREIGN PATENT DOCUMENTS

| | | | |
|---|---|---|---|
| 2636246 | 2/1978 | Fed. Rep. of Germany | 376/249 |
| 2726547 | 12/1978 | Fed. Rep. of Germany | 376/249 |
| 2830306 | 1/1980 | Fed. Rep. of Germany | 376/249 |

*Primary Examiner*—Sal Cangialosi
*Attorney, Agent, or Firm*—Ivor J. James, Jr.; Samuel E. Turner; Raymond G. Simkins

[57] ABSTRACT

Apparatus for remotely controlled examination of the control rod drive penetration stub tubes in the wall of a nuclear reactor pressure vessel including a rotatable carriage on which is mounted a reciprocable shaft to which is attached an inspection instrument for scanning the stub tubes.

9 Claims, 13 Drawing Figures

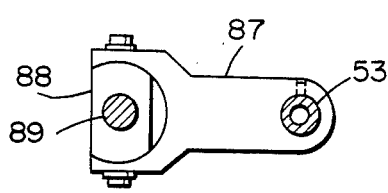
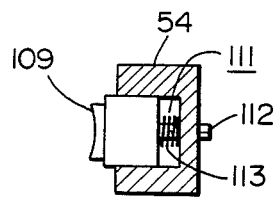
FIG. 3E
FIG. 3F
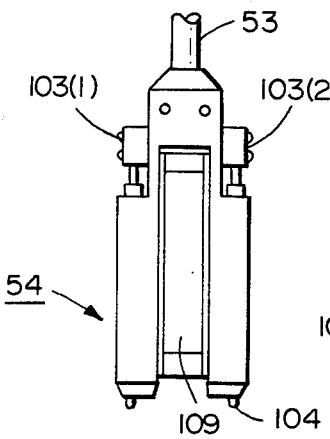
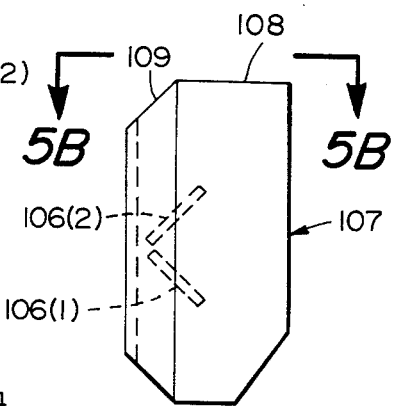
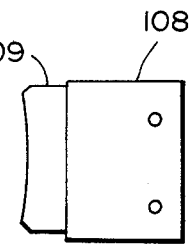
FIG. 4
FIG. 5A
FIG. 5B
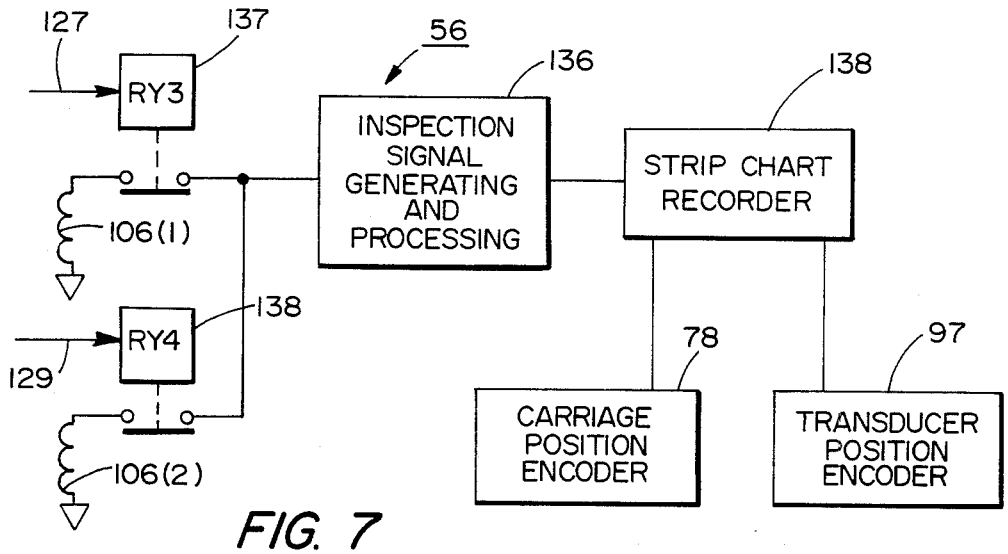
FIG. 7

STUB TUBE INSPECTION DEVICE

BACKGROUND

This invention relates to the non-destructive examination (such as ultrasonic examination) of stub tubes in the wall of a pressure vessel and particularly the stub tubes in the lower head of a nuclear reactor pressure vessel for receiving control rod drive housing tubes.

In a known type of nuclear reactor, for example as used in the Dresden Nuclear Power Station near Chicago, Illinois, the reactor core is of the heterogeneous type. That is, the core comprises a plurality of fuel assemblies vertically arranged in spaced array to form the nuclear reactor core capable of self-sustained nuclear fission reaction. The core is contained in a pressure vessel wherein it is submersed in a working fluid, such as light water, which serves both as a coolant and as a neutron moderator. A plurality of control rods, containing neutron absorbing material, are selectively insertable into the gaps or spaces between fuel assemblies to control the reactivity of the core.

Each fuel assembly comprises a tubular flow channel containing a fuel rod bundle formed of an array of elongated, cladded fuel elements or rods supported between upper and lower tie plates. The fuel assemblies are supported on control rod guide tube sockets in the pressure vessel between an upper core grid and a lower core plate. Each fuel assembly includes a nose piece which fits into the support socket and receives coolant from a pressurized coolant supply chamber. The pressurized coolant flows upward through the fuel assembly flow channel to remove heat from the fuel elements. A typical fuel assembly of this type is shown, for example, by D. A. Venier et al in U.S. Pat. No. 3,350,275.

A drive device for moving the control rods into and out of the core of the reactor is shown, for example, for R. R. Hobson et al in U.S. Pat. No. 3,020,887. As shown therein drive mechanism 36 is housed in a tube or thimble 38 which penetrates the lower head of the pressure vessel 10 and supports control rod guide tube 54.

As illustrated in this patent (FIG. 4), the control rod drive housing tube or thimble 38 extends through a hole in the pressure vessel 10 and is directly welded therein using welds 80 and 82.

However, according to common practice the housing tube is not welded directly to the pressure vessel. Instead, a stub tube is interposed between the housing tube and the pressure vessel, the stub tube being welded to the pressure vessel at its lower end and being welded at its upper end to the control rod drive housing tube extending therethrough.

Such stub penetrations thus become a part of the pressure vessel boundary and any defects (e.g., cracks) therein jeopardize the integrity of the pressure system.

It is desirable to provide non-destructive examination of the pressure system of nuclear reactors or the like to verify the integrity of the system or to discover any incipient defects so that appropriate repairs can be made before failure occurs.

A system for examining the walls of the pressure vessel and the seam welds therein is shown by J. P. Clark et al in U.S. Pat. Nos. 3,988,922 and 4,010,636. A system for examining vessel-to-nozzle and nozzle-to-pipe welds is shown by J. P. Clark et al in U.S. Pat. No. 3,934,457.

An object of this invention is to provide a system for the remotely controlled examination of the stub tube penetrations of a pressure vessel.

Another object is to scan successive radially spaced vertical paths on stub tubes in a pressure vessel.

Another object is an inspection device which readily can be placed in engagement with a stub tube penetration in a pressure vessel and which will automatically scan the outer surface of the stub tube upon initiation of a scanning operation.

SUMMARY

The objects of the invention are achieved by an instrument carrying inspection device which can be lowered into the pressure vessel for engagement with a stub tube after removal of the associated fuel assemblies, control rod and control rod guide tube.

The inspection device includes a central shaft member fitted at its bottom end with a cage sized to engage the upper end of a stub tube to be examined and to enclose the control rod drive housing tube supported by the stub tube.

At its upper end, the central shaft is fitted with a tubular upward extension to which is affixed a plurality of laterally extending fins for engaging the aperture or hole in the lower core support plate normally occupied by the removed control rod guide tube. This provides lateral location and support of the inspection device.

Journalled on the central shaft is a rotatable carriage. This carriage bears a vertically oriented instrument shaft which is selectively reciprocatable. Fitted to the lower end of the instrument shaft is a suitable inspection instrument such as a pair of ultrasonic transducers housed in a suitable transducer holder, one of the transducers being a "downward looking" transducer while the other is an "upward looking" transducer.

In operation of the device, the instrument shaft is reciprocated to provide upward and downward scans of a vertical path on the stub tube under examination. The rotatable carriage is then moved a small amount (for example, 4 degrees) and the instrument shaft is again reciprocated to scan a parallel vertical path on the stub tube, etc. This succession of scans and incremental rotations is continued until the entire stub tube has been inspected.

Suitable driving and switching and control devices are provided for remotely moving the carriage and reciprocating the instrument shaft and for automatic control of the scanning operation.

DRAWING

FIG. 3E is a top view of the reciprocating arm;

FIG. 3F is a transverse cross section view of the transducer holder;

FIG. 4 is a front elevation view of the transducer holder;

FIG. 5A is a side elevation view of the transducer block;

FIG. 5B is a top view of the transducer block;

FIG. 7 is a block diagram of inspection signal circuits.

DESCRIPTION

Figure 1:
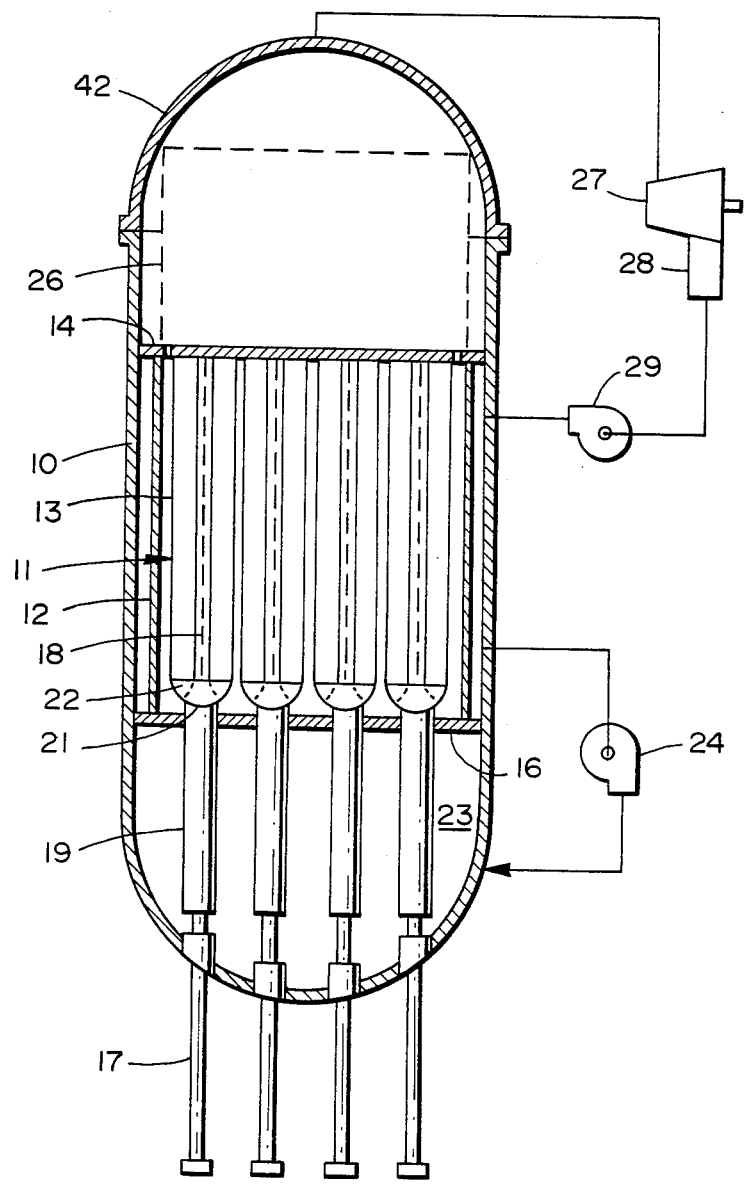
FIG. 1 is a schematic illustration of a water cooled and moderated nuclear reactor steam supply system.

The invention is described herein as applied to the examination of the stub tubes of the control rod drive penetrations in a water cooled and moderated nuclear reactor of the boiling water type, an example of which is illustrated in simplified schematic form in FIG. 1. Such a reactor system includes a pressure vessel 10 containing a nuclear reactor core 11 submerged in a coolant-moderator such as light water. The core 11, which is surrounded by an annular shroud 12, includes a plurality of replaceable fuel assemblies 13 arranged in spaced relation between an upper core grid 14 and a lower core plate 16. (A typical such fuel assembly is shown for example, in U.S. Pat. No. 3,689,358.)

A plurality of control rod drive housing tubes 17 (FIGS. 1 and 2) penetrate the pressure vessel 10 and house control rod drives (as shown, for example in U.S. Pat. No. 3,020,887) by which a plurality of control rods 18 are selectively insertable among the fuel assemblies 13 for control of the reactivity of the core.

The control rod drive housing tubes 17 support control rod guide tubes 19 which receive and house the control rods when they are withdrawn from the core. The guide tubes, in turn, support fuel assembly support members 21 each of which is formed with sockets for receiving the nose pieces 22 of four adjacent fuel assemblies.

The nose pieces 22 and the support members 21 are formed with coolant passages or openings for communication with a coolant supply chamber 23. A coolant circulation pump 24 pressurizes the coolant in supply chamber 23 from which the coolant is thus forced through the openings in support members 21 and the nose pieces 22 upward through the fuel assemblies. A part of the coolant is thereby converted to steam which passes through a separator-dryer arrangement 26 to a utilization device such as a turbine 27. Condensate formed in a condenser 28 is returned as feedwater to the vessel 10 by a pump 29.

Figure 2:
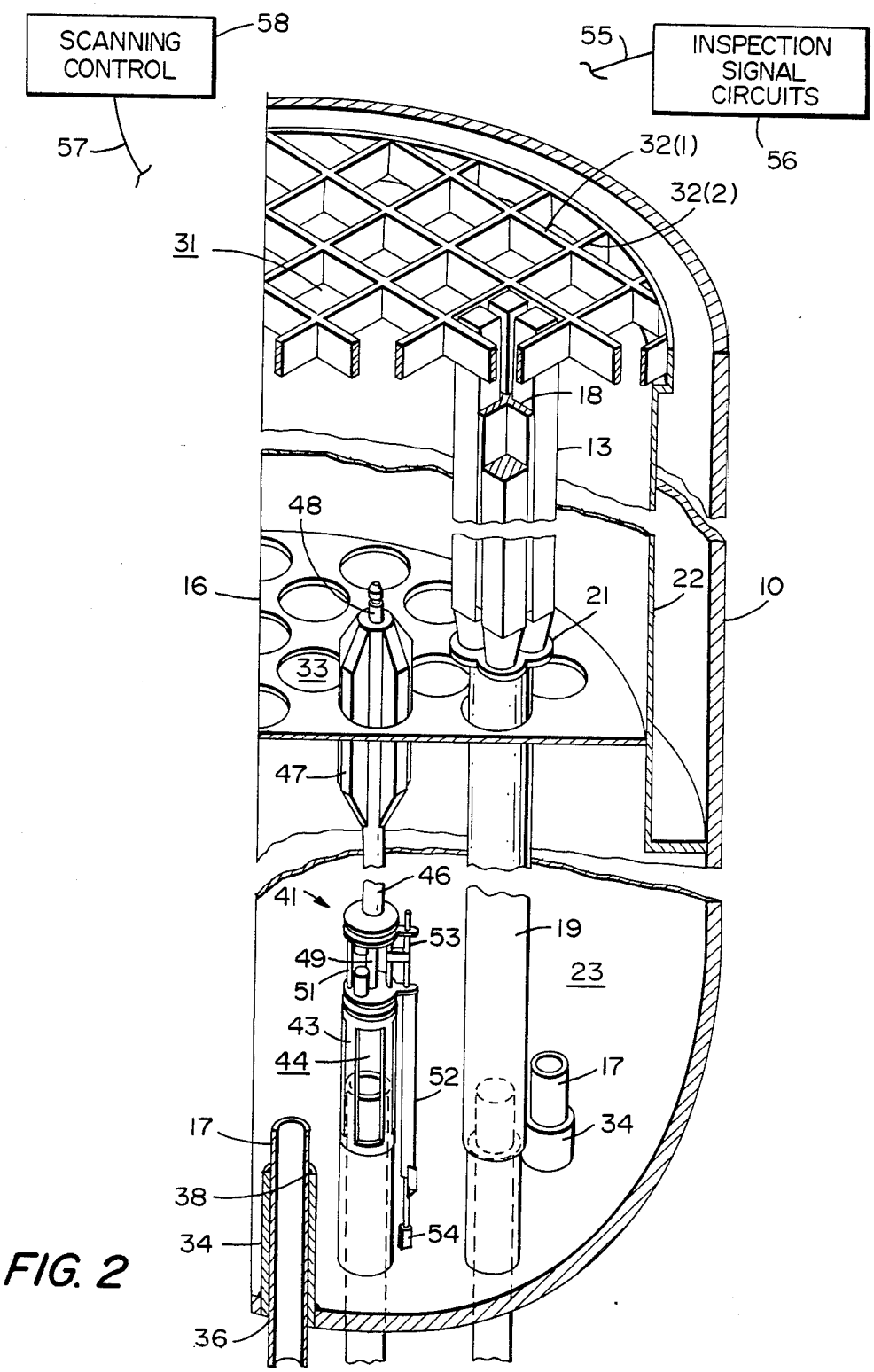
FIG. 2 is a partly cut away isometric view of the lower portion of a reactor pressure vessel.

Each control rod 18 and the four fuel assemblies 13, as shown in FIG. 2, comprise a fuel cell of the core. The four fuel assemblies are laterally supported at their upper ends in an opening 31 in the upper core grid 14 formed by intersecting and interlocking beams 32 (1) and 32 (2).

At their lower ends the four fuel assemblies are vertically supported on the fuel assembly support member 21 fitted to the top end of control rod guide tube 19, lateral support being provided by passage of the guide tube 19 through an aperture or hole 33 in the lower core plate 16.

As mentioned hereinbefore, the control rod guide tubes 19 are supported by the control rod drive housing tubes 17 (only three of which are shown in FIG. 2). The lower end of the guide tube 19 is removably connected to the top end of housing tube 17. For example, a short length of the lower end of guide tube 19 may be bored for a slip fit over the upper end portion of housing tube 17 and an internal shoulder (not shown) in the guide tube 19 may engage the upper end of the housing tube 17.

Such a connection allows removal of the guide tube 19 from the vessel 10 through the hole 33 and the opening 31 after removal of the four fuel assemblies 13 of the cell as well as the control rod 18 and the fuel assembly support member 21. This allows access of the inspection device of the invention to the chamber 23 through the vacated hole 33 in the lower core plate 16 for examination of the stub tube penetrations as described below.

Penetration of the control rod drive housing tubes 17 through the bottom of the vessel 10 is accomplished by the use of stub tubes 34. Each stub tube 34, suitably shaped at its bottom end to fit the curvature of the bottom of the vessel 10 at its particular location, is secured in an aperture or hole 36 in the vessel 10 by a weld 38.

The need for precise positioning of stub tube 34 is avoided by finish boring of its inside diameter, after it is welded in place, to receive the housing tube 17. The housing tube 17 is welded, by a weld 38, to the top end of the housing tube after the housing tube 17 is properly positioned vertically with all of the top ends of the housing tubes 17 in the same horizontal plane. This means that the housing tubes 17 extend into the vessel 10 by varying amounts because of the curvature of the bottom of the vessel 10.

As is evident from the foregoing, the stub tubes 34 become a part of the pressure vessel boundary and any defect (e.g., cracks) therein can jeopardize the integrity of the pressure system. It is, therefore, desirable to examine the stub tubes periodically to discover any incipient defects so that appropriate repairs can be made before failure occurs. The inspection device of this invention is designed to accomplish that purpose.

Such inspection device 41 is shown in elementary form in FIG. 2 with its lower end in engagement with one of the stub tubes 34 and with its upper end laterally supported in one of the holes 33 in the lower core plate 16. It is to be understood that handling equipment (not shown) is available at the reactor site to remove the top cover 42 (FIG. 1) of the pressure vessel 10 and to remove the separator-dryer 26, the four fuel assemblies 13, the control rod 18, the support member 21 and the guide tube 19 of the fuel cell position from the pressure vessel 10 and to lower the inspection device 41 into position, the pressure vessel 10 remaining filled with water to a level above the upper core grid 14. It is to be further understood that FIG. 2 is not necessarily to scale and that the size of the inspection device 41 is such that it can be passed through the hole 33 in the lower core plate 16.

The inspection device 41 includes a lower cylindrical portion or cage 43 having an inside diameter sized to slip over the housing tube 17 and bear upon the top of the stub tube 34 whereby the lower end of the inspection device 41 is properly located to carry out the examination of the stub tube 34. The lower inner end of the cage 43 is formed with a taper to avoid contact with and thus possible uneven seating on the weld bead 38 between housing tube 17 and stub tube 34. The cage 43 is formed with cutouts 44 to decrease weight and to allow visual observation of engagement of the cage 43 with the stub tube 34 by use of, for example, an underwater television camera (not shown).

An upper portion of the inspection device 41 is formed by an elongated tubular upper guide member 46 the upper portion of which is fitted with laterally extending fins 47 sized for close fit in the hole 33 of the lower core plate 33 whereby the upper end of the inspection device 41 is laterally located and supported. At its upper end the guide member 46 is formed with an extension 48 having its end suitably shaped for removable attachment to a handling tool (not shown) by which the inspection device can be lifted and maneuvered remotely.

Connected between the cage 43 and guide member 46 is a central shaft 49. Journalled on the shaft 49 is a rotatable carriage 51. Supported by the carriage 51 and extending downward, alongside the cage 43, is an elongated housing 52 in which is journalled a reciprocatable instrument shaft 53.

Attached to the lower end of the instrument shaft 53 is an inspection instrument, for example, a transducer holder 54 containing one or more ultrasonic transducers, for examining the stub tube 34. Preferably the instrument shaft 53 is tubular to provide a convenient passage for a cable 55 of suitable leads for transmitting signals between the inspection instrument and suitable inspection signal circuits 56 (for generating, processing and recording the inspection signals) located at an operator's station outside the pressure vessel 10.

Mounted on the carriage 51 are suitable drive motors for remote reciprocation of the instrument shaft 53 and incremental rotation of the carriage 51 by which a succession of parallel vertical scans of the stub tube 34 can be performed as described in more detail hereinafter. The drive motors are connected by a cable 57 of suitable leads to a suitable scanning control circuit 58 located at the operator's station outside the pressure vessel 10.

Figure 3A:
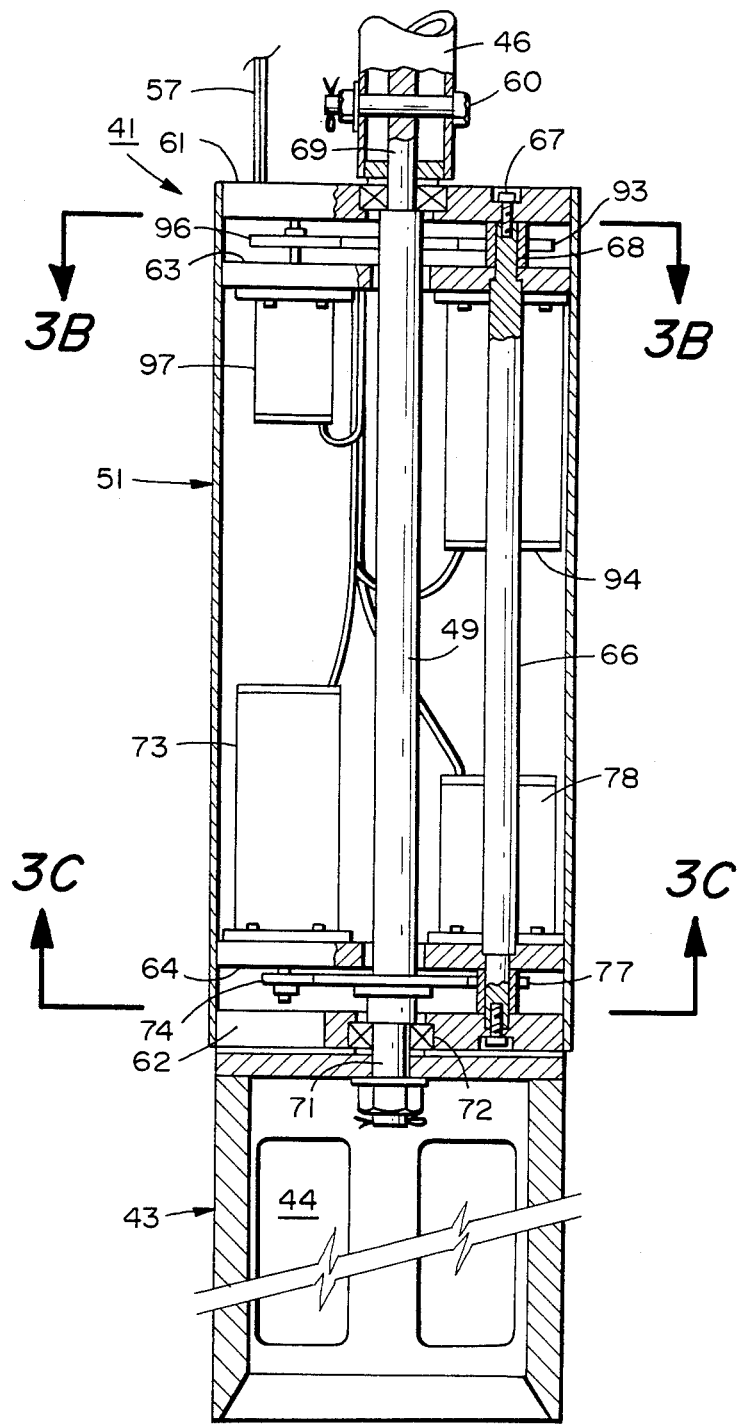
FIG. 3A is a vertical cross section view of the carriage and cage of the inspection device.

The inspection device 41 is shown in greater detail in FIGS. 3A–3F. FIG. 3A is a longitudinal cross section or elevation view partly cutaway for clarity.

The tubular upper guide member 46 is fitted at its lower end with a cap 59 bored to receive an upper extension of the central shaft 49 to which the guide member 46 may be secured by a bolt 60.

The basic framework of the carriage 51 consists of upper and lower end plates 61/62 and upper and lower intermediate end plates 63/64 held in spaced relation by four (see FIG. 3B) shouldered tie rods 66 and secured by cap screws 67. (For clarity, only one of the tie rods 66 is shown in FIG. 3A.) The end plates at each end are spaced apart by spacer sleeves 68.

The central shaft 49 is formed with upper and lower end portions or extensions 69/71. Bearings 72 fitted on the end portions 69/71 and fitted in seats in the end plates 61/62 provide for rotation of the carriage 51 about the central shaft 49. Angular movement of the carriage 51 (with respect to the central shaft 49) is accomplished remotely by control of a carriage drive motor 73 mounted on the lower intermediate end plate 64 and with its output shaft geared to the shaft 49 through a motor gear 74 (FIGS. 3A/3C) and a shaft gear 76 fixed to the central shaft 49. The motor 73 may be a well-known gear-head motor, the gear ratios being selected to provide a rotation speed of the carriage 51 of in the order of 1.3 revolutions per minute.

Also mounted on the lower intermediate end plate 64, and geared to the shaft gear 76 through a gear 77, is a position indicator 78 for sensing and indicating the angular position of the carriage 51 (with respect to the shaft 49). In simple analog form the position indicator 78 may be a multiturn potentiometer or it may be, for example, a suitably geared digital position encoder such as sold by Dynamics Research Corp. under catalog No. 152-121-200-18S.

Figure 3D:
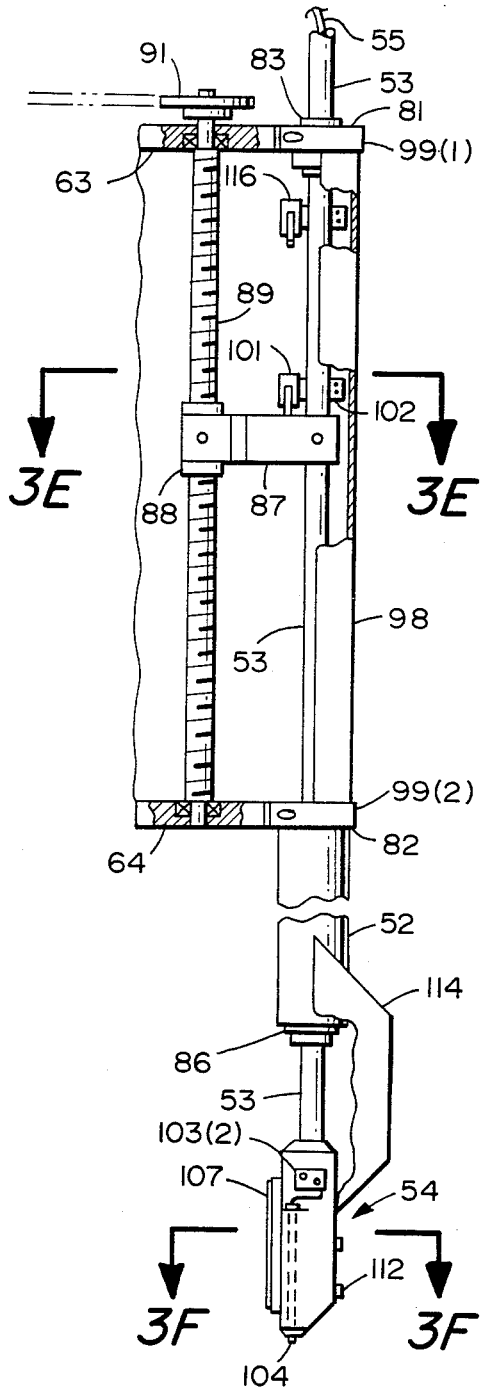
FIG. 3D is a partial, and partly cut away, elevation view of the carriage of the inspection device rotated 90 degrees with respect to the view of FIGS. 3A, 3B and 3C.
Figure 3B:
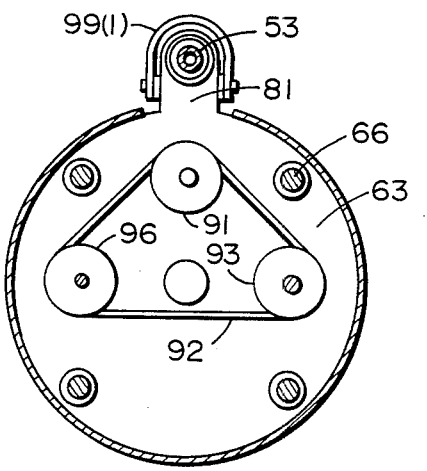
FIG. 3B is a first transverse cross section view of the inspection device.

The construction and drive arrangement for the reciprocatable instrument shaft 53 (FIG. 2) will now be discussed with reference to FIGS. 3A, 3B, 3C, and 3D. FIG. 3B is a transverse cross section view providing a top view of the upper intermediate end plate 63. FIG. 3D is a partial, partly cutaway side elevation view of the carriage 51 illustrating the mounting, part of the drive and the housing of the instrument shaft 53 and also showing the transducer holder 54 fitted to the lower end of the instrument shaft 53.

Figure 3C:
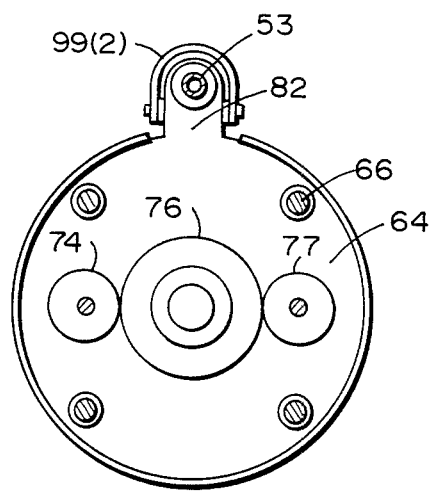
FIG. 3C is a second transverse cross section view of the inspection device.

The instrument shaft 53 is supported by the carriage 51 by vertically aligned lateral extensions 81/82 from the upper intermediate end plate 63 (FIGS. 3B and 3D) and the lower intermediate end plate 64 (FIGS. 3C and 3D). The shaft 53 is journalled directly (for reciprocating motion) in the upper extension 81 by a ball bushing 83.

Secured to the lower extension 82 is the downwardly extending, elongated tubular instrument shaft housing 52. The lower end of the instrument shaft 53 is journalled in the lower end of the housing 84 by a ball bushing 86.

To provide reciprocation of the shaft 53, one end of an arm 87 (FIGS. 3D and 3E) is secured thereto. Fitted to the other end of the arm 87 is a nut 88 (preferably a ball nut) mounted on a threaded shaft or screw 89. The screw 89 is journalled for rotation in the upper and lower intermediate end plates 63/64. Thus rotation of the screw 89 drives the arm 87 and hence the instrument shaft 53 upward or downward. Rotation of the screw 89 is provided by a pulley 91 driven by a belt 92 (FIG. 3B) which, in turn, is driven from a pulley 93 on the shaft of a suitably geared instrument shaft drive or scan motor 94 (FIG. 3A) secured to the upper intermediate end plate 63. Preferably the drive arrangement is such as to provide an instrument shaft speed in the order of 150 inches per minute.

Also driven by the belt 92 is a pulley 96 fixed to the shaft of a suitable position indicator or encoder 97 mounted on the upper intermediate end plate 63. (The position indicator 97 may be a suitable position encoder such as a Dynamics Research Co. encoder catalog No. 152-121-200-185). The encoder 97 indicates the linear position of the instrument shaft 53 and hence the vertical position of the transducers in the holder 54. For reliable operation of the position encoder 97, it is preferable that the belt 92 and pulleys 91, 93 and 96 be of the non-slip type, for example, toothed belt and pulleys.

To protect the instrument shaft 53 during handling and maneuvering of the inspection device 41 (and to provide a mount for limit microswitches as described hereinafter) a U-shaped cover 98 is secured to the upper and lower extensions 81/82 by, for example, clamps 99(1) and 99(2).

Secured to the lower end of the instrument shaft 53 is the transducer holder 54 which is shown in side elevation view in FIG. 3D, in transverse cross section view in FIG. 3F and in front elevation view in FIG. 4.

As shown in FIG. 3D, the transducer holder 54 is vertically positioned at the upper limit of its normal scanning stroke. This position of the transducer housing 54 is determined by a microswitch 101, mounted on the cover 98 by a bracket 102, that engages the instrument shaft drive arm 87 for normally indexing the carriage 51 radially and reversing the drive motor 94 to start movement of the instrument shaft 53 and the transducer block 54 downward for another scanning stroke.

The lower limit of the scanning stroke is determined by a pair of microswitches 103(1)/103(2) mounted on either side of the transducer holder 54 (FIG. 4). The spring loaded operating levers of these microswitches engage the heads of headed pins 104 which are fitted in vertical holes in the holder 54 and are formed with rounded tips which extend somewhat beyond the lower end of the holder 54.

Thus in the downward movement of the transducer block 54 one or the other of the tips of the pins 104 contacts the bottom of the vessel 10 (see FIG. 2) or the weld bead between the vessel 10 and the stub tube 34 whereby one or the other of the microswitches 103(1)/103(2) is actuated to reverse the instrument shaft drive motor 94 for upward movement of the transducer block 54 to complete the scanning stroke. The two microswitches 103(1)/103(2) and actuating pins 104 are provided on either side of the transducer block 54 to ensure proper reversal of the drive motor 94 despite the angularity of the attachment between the stub tubes 34 and the bottom of the vessel 10.

In the illustrated stub tube inspection device the transducers employed to examine the stub tubes 34 are of the ultrasonic signal type. Two such transducers 106(1)/106(2) are used and they are mounted in a transducer block 107 as shown in a side elevation view thereof in FIG. 5A.

The transducer block 107 is formed of an open-sided, generally rectangular metal shell 108 in which the transducers 106(1)/106(2) are embedded in a potting material or plastic 109 (such as a plastic suitable for transmitting ultrasonic signals). The material 109 extends outward from the open side of the shell 108 and is formed with a curved outer face (as shown in top view in FIG. 5B) to fit the outer diameter of the stub tube 34. (Since the vessel 10 is filled with water to a level above the nuclear fuel core during use of the inspection device of this invention, good ultrasonic signal coupling through plastic 106 and through the water film between the face of plastic 106 and the stub tube 34 is maintained.)

As shown in FIG. 5A, the ultrasonic transducers 106(1)/106(2) are positioned in the transducer block 107 at an angle to the vertical (for example at 45 degrees). The transducer 106(1) is made active during the downward portion of the scanning stroke to provide a "downward looking" scan of the stub tube 34 and the transducer 106(2) is made active during the upward portion of the scanning stroke to provide an "upward looking" scan along the same path on the stub tube 34.

Signal leads from the transducers 106(1)/106(2) (not shown) extend upward through the tubular instrument shaft 53 as the cable 55 (FIG. 2) to the inspection signal generating and processing device 56.

A suitable transducer arrangement is available from Search Unit Systems, Inc., as Catalog No. SUS-244.

The transducer block 107 is resiliently mounted in a groove 111 (FIG. 3F) in the face of the holder 54 by a pair of cap screws 112 (FIG. 3D). Mounted on the screws 112 between the holder 54 and the block 107 are springs 113 which urge the face of block 107 into contact with the stub tube 34.

To protect the transducer holder 54 during handling and maneuvering of the inspection device 41, the instrument shaft 53 may be moved upward until it is substantially fully retracted into the housing 52 (FIG. 3D). This places the transducer holder 54 within the protection of a U-shaped shroud 114 (shown partly cutaway in FIG. 3D) the two opposite sides of which are secured to the housing 52 and extend downward along side the transducer holder 54. To place the transducer holder 54 in this retracted position, the upper limit microswitch 101 is overridden to actuate the drive motor 94 for upward movement. The retracted position is determined by a microswitch 116, the operating lever of which is actuated by engagement with the arm 87 to open the power circuit to the drive motor 94.

The inspection device 41 of the invention scans the stub tube 34 in the vertical or longitudinal direction because any cracks in the stub tube 34 are expected to be in the horizontal or circumferential direction of the stub tube.

The scanning control system or circuit 58 (FIG. 2) may take a variety of suitable forms. A simplified scanning control circuit 58 is shown in schematic form in FIG. 6 as an illustration of the functions deemed desirable including automatic scanning.

The scanning control circuit 58 includes a "down" control relay 121 (RY1), an "up" control relay 122 (RY2) and a timer or delay device 123. The terminals marked with P and P' are connected to sources of suitable electric power. Each of the relays 121 and 122 includes an operate (OPR) circuit and a hold circuit. Power applied to the operate circuit will actuate the relay. Power applied to the hold circuit alone will not actuate the relay but will hold an actuated relay in its actuated state.

Figure 6:
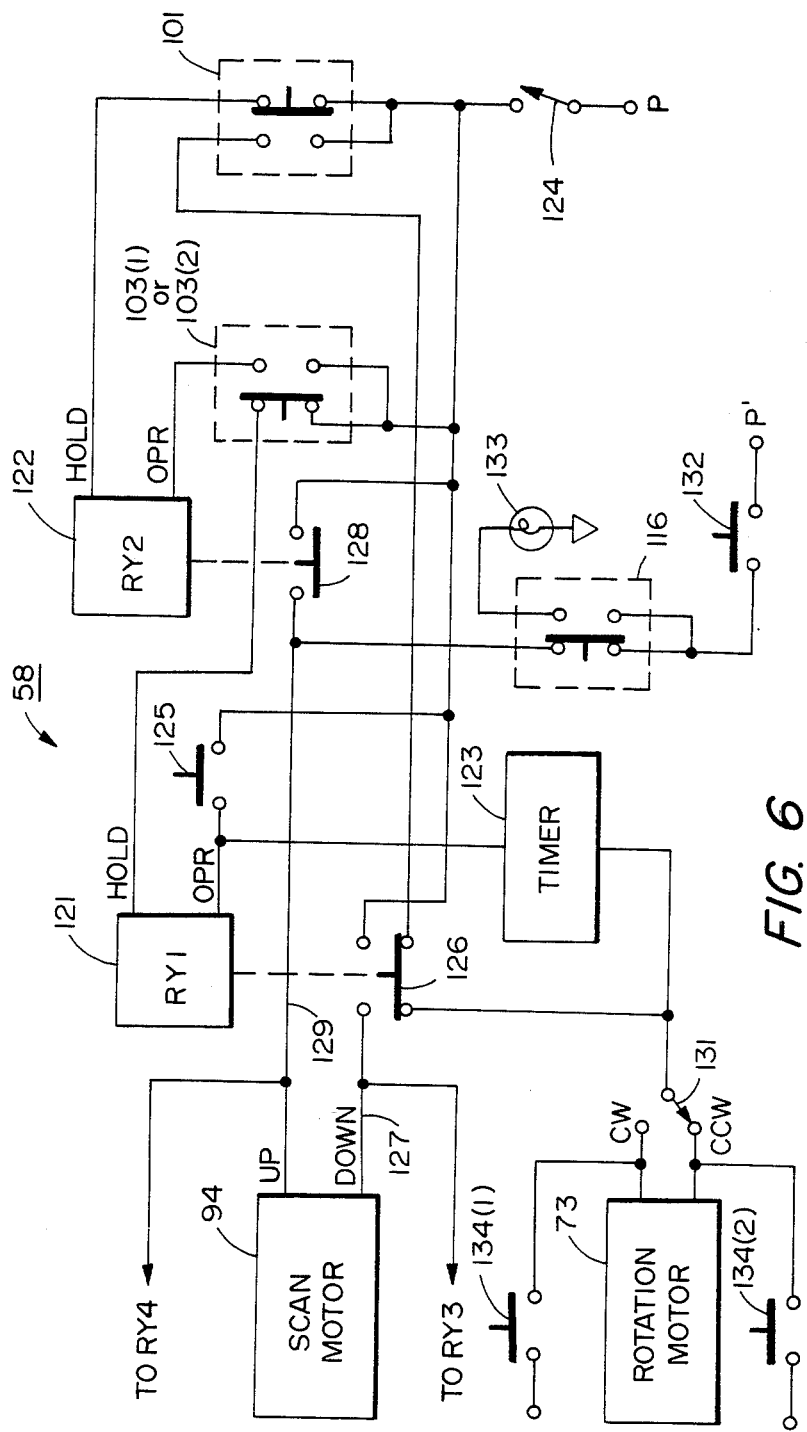
FIG. 6 is a block diagram of a scanning control circuit.

Further details of the circuit 58 will be described in the following explanation of circuit operation to control a scanning stroke (that is, a down scan followed by an up scan along the same vertical path on the stub tube 34) it being understood that as shown in FIG. 6 all switches and relay contacts are shown in their normal or "unoperated" state.

As an initial condition it is assumed that the transducer block 54 (FIG. 3D) is in its uppermost or retracted position (wherein the normally closed contacts of microswitch 116 are open by engagement of its operating lever with arm 87 as described hereinbefore).

Operation is initiated by closing a power switch 124 and momentarily closing a "start" switch 125 which applies power to the operate circuit of down relay 121. Relay 121 remains actuated by power applied to its hold circuit through the normally closed contacts of microswitches 103(1)/103(2). Upon actuation of relay 121 its contact switch blade 126 moves upward to close the normally open contacts of the relay whereby power is applied through a "down" lead 127 to energize scan motor 94 in a direction to drive the instrument shaft 53 (FIG. 3D) and hence the transducer holder 54 downward to perform the downward portion of the scanning stroke.

The downward portion of the scanning stroke is completed when the pins 104 in the transducer holder 54 contact the bottom of the vessel 10 and actuate one or the other (or both) of the lower limit microswitches 103(1)/103(2). (Only one of the microswitches 103(1)/103(2) is shown in FIG. 6 for clarity, it being understood that the normally closed contacts thereof are connected in series while their normally open contacts are connected in parallel).

Upon actuation of the microswitches 103(1)/103(2), the normally closed contacts thereof open and the normally open contacts close. This removes power from the hold circuit of down relay 121 to return it to its unactuated state which opens the lead 127 to remove power from scan motor 94. Closure of the normally closed contacts applies power to the operate circuit of up relay 122, the hold circuit thereof being energized through the normally closed contacts of upper limit microswitch 101.

Upon actuation of up relay 122 its contact switch blade 128 moves upward to close the normally open contacts of the relay whereby power is applied through an "up" lead 129 to energize the scan motor 94 in a direction to drive the transducer holder 54 upward to perform the upward portion of the scanning stroke.

The upward portion of the scanning stroke is completed when the arm 87 (FIG. 3C) engages and actuates the upper limit microswitch 101. The normally closed contacts of microswitch 101 open to remove hold power from up relay 122 with the result that its now open contacts remove power from the scan motor 94. Additionally, the normally open contacts of microswitch 101 close to apply power to the carriage rotation motor 73 and to timer 123.

Energization of the rotation motor 73 moves the carriage 51 (FIG. 3A) clockwise or counterclockwise (as selected by a rotation direction switch 131) by an amount determined by the motor speed, its drive ratio to the instrument shaft 53 and the period of timer 123. These parameters are selected to move the transducer holder 54 radially, for example, in the order of 4 degrees, and position it for the next scanning stroke along a vertical path on the stub tube 34 parallel to the path of the first scanning stroke.

In simple form the timer 123 may be a well-known spring return timing motor which closes a pair of contacts after a selected period of time and automatically resets when power is removed.

At the end of its timing period, timer 123 applies power to the operate circuit of down relay 121 by which it is actuated to move its switch blade 126 upward thus disconnecting power to the rotation motor 73 and timer 123 and applying power to the scan motor 94, through down lead 127, to begin the next scanning stroke.

The scanning control circuit 58 of FIG. 6 thus will continue the above-described sequence of operations automatically to scan successive parallel paths around the circumference of the stub tube 34 until such scanning operations are terminated, for example, by opening the power switch 124. If desired, automatic termination of scanning readily can be arranged, for example, by mounting a microswitch (not shown) for actuation by the carriage 51 when it reaches a predetermined radial position. Alternatively, the signal from the carriage position encoder 78 can be used to actuate a power cutoff switch (not shown) when the encoder signal attains a preselected value.

When scanning of a particular stub tube 34 is completed and the inspection device 41 is to be moved, the transducer holder 54 can be moved upward to its retracted position by closing a normally open retract switch 132. This applies power from source P' to the scan motor 94 through the normally closed contacts of microswitch 116 and up lead 129. When the retracted position is reached the normally closed contacts of microswitch 116 are open to cut off power to the scan motor 94 and the normally open contacts of microswitch 116 are closed to light a lamp 133 as an indication that the retract position has been reached.

Also connected to power source P' are normally open switches 134(1)/134(2) in leads to the clockwise (CW) and counterclockwise (CCW) inputs of carriage rotation motor 73 by which the carriage 51 can be moved to any selected radial position, for example, for prepositioning the carriage 51 prior to a scanning operation.

The inspection signal circuits 56 (FIG. 2) are illustrated in block diagram form in FIG. 7.

A suitable, well-known inspection signal generating and processing unit 136 is provided to transmit and receive ultrasonic or acoustic signals to and from the transducers 106(1)106(2). During the downward scan, the downward-looking transducer 106(1) is connected to the unit 136. This is accomplished by, for example, a relay 137 (RY3) which is actuated to close its normally open contacts when power is applied to down lead 127 (FIG. 6). Similarly, the upward-looking transducer 106(2) is connected to the unit 136 by a relay 138 (RY4) when power is applied to the up lead 129 (FIG. 6).

What is claimed is:

1. A remotely positionable and controllable inspection device for inspecting stub tubes welded at their lower ends in apertures in the curved bottom of a nuclear reactor pressure vessel and extending vertically into said vessel, said stub tubes being adapted to receive therethrough control rod drive housing tubes, said housing tubes and said stub tubes being welded together at the upper ends of said stub tubes, said housing tubes extending into said vessel a varying amount because of the curvature of the bottom of said vessel, the upper ends of said housing tubes being in a common lateral plane, control rod guide tubes supported on said housing tubes and extending upward through holes in a laterally extending lower core plate in said vessel, fuel assembly support members supported on said guide tubes, a plurality of fuel assemblies supported by each said support member, the upper ends of said fuel assemblies extending into an opening in an upper core grid for lateral support, said fuel assemblies and the associated support member and guide tube being removable from said vessel to provide access of said inspection device to the stub tube to be inspected, said inspection device comprising: a central shaft; an elongated, downward extending cage member secured to the lower end of said central shaft, said cage member having an inside diameter sized to slip over the housing tube extending through said stub tube, the lower end of said cage member bearing upon the top end of said stub tube for engaging and locating said inspection device on said stub tube with said central shaft in axial alignment with said stub tube; an elongated upward extension member secured to the upper end of said central shaft and extending through the hole in said lower core plate vacated by removal of said guide tube, said extension member having means at its upper end for connection to handling apparatus for lifting and maneuvering said inspection device and being fitted with a plurality of laterally extending members for engaging said hole to provide upper lateral support of said inspection device to maintain said inspection device in axial alignment with said stub tube: a carriage journalled for rotation on said central shaft; a vertically oriented instrument shaft supported on said carriage and journalled for reciprocation, said instrument shaft extending downward alongside said cage member with its lower end in the vicinity of said stub tube; an inspection instrument secured to the lower end of said instrument shaft and positioned adjacent said stub tube; remotely controllable instrument shaft drive means mounted on said carriage and coupled to said instrument shaft for selectably moving said inspection instrument downward and upward through a scanning stroke along a vertical path on said stub tube and remotely controllable carriage drive means mounted on said carriage and coupled to said central shaft for incrementally rotating said carriage between scanning strokes whereby a succession of spaced vertical paths on said stub tube can be scanned.

2. The device of claim 1 wherein said instrument shaft drive means includes a threaded shaft mounted for rotation on said carriage and positioned in spaced, parallel relation to said reciprocatable instrument shaft; a drive arm having one end fixed to said instrument shaft and extending laterally therefrom; a threaded nut secured to the other end of said drive arm and engaging said threaded shaft; and means coupling said drive means to said threaded shaft for rotation thereof whereby rotation of said threaded shaft causes linear movement of said instrument shaft.

3. The inspection device of claim 1 including a lower limit switch mounted on said inspection instrument and actuated by contact with said bottom of said vessel to indicate the lower limit of said scanning stroke; and an upper limit switch actuated when said inspection instrument reaches the vicinity of the upper end of said stub tube to indicate the upper limit of said scanning stroke.

4. The inspection device of claim 3 including a scanning control circuit for controlling said instrument shaft and carriage drive means, said control circuit being responsive to actuation of said lower limit switch to reverse the direction of drive of said instrument shaft drive means for upward movement of said inspection instrument and being responsive to actuation of said upper limit switch for first energizing said carriage drive means for incremental rotation of said carriage and then energizing said instrument shaft drive means for downward movement of said inspection instrument 5. The inspection device of claim 1 wherein said inspection instrument contains at least one inspection signal transducer and further including inspection signal circuits for transmitting spaced inspection signal pulses to said transducer and for receiving reflected inspection signals from said transducer in intervals between said inspection signal pulses, said inspection signal circuits including a recorder for said reflected inspection signals; and carriage position and instrument shaft position indicating devices providing position signals to said recorder indicative of the position of said inspection instrument with respect to the surface of said stub tube whereby the position of origin on said stub tube of a reflected inspection signal may be determined.

6. The inspection device of claim 1 wherein said inspection instrument includes a first inspection signal transducer oriented at an angle downward and toward said stub tube and a second inspection signal transducer oriented at an angle upward and toward said stub tube and further including inspection signal circuits for transmitting signals to and receiving signals from said transducers; and switching means for connecting said first transducer to said inspection signal circuits when said inspection instrument is moving downward and for connecting said second transducer to said inspection signal circuits when said inspection instrument is moving upward whereby said inspection signals are transmitted into said stub tube at an angle to the surface thereof.

7. The inspection device of claim 1 wherein a retracted position of said inspection instrument is provided, said retracted position being upward beyond the upper limit of said scanning stroke; selectably operable switch means for energizing said instrument shaft drive means for moving said inspection instrument to its retracted position; and a protective shroud at least partly enclosing said inspection instrument in its retracted position for protecting it from damage during lifting and maneuvering of said inspection device.

8. The inspection device of claim 7 including a limit switch for cutting off power to said instrument shaft drive means when said inspection instrument reaches its retracted position and an indicator for signaling this event.

9. A remotely positionable and controllable inspection device for inspecting stub tubes extending into a vessel from the bottom head thereof, each stub tube having a housing tube extending therethrough into said vessel, said vessel containing a laterally extending support plate formed with apertures in vertical alignment with said stub tubes, said device comprising: a central shaft; an elongated cage member secured to the lower end of said central shaft and extending downward to engage the upper end of a stub tube to be inspected and enclosing the housing tube extending through said stub tube; an elongated upward extension member secured to the upper end of said central shaft and extending through an aperture in said support plate; means fixed to said extension member for engaging said aperture in said support plate to provide upper lateral support of said inspection device; a carriage journalled for rotation on said central shaft; a vertically oriented instrument shaft supported on said carriage and journalled for reciprocation, said instrument shaft extending downward alongside said cage member; an inspection instrument secured to the lower end of said instrument shaft and positioned adjacent said stub tube; and means for rotating said carriage and reciprocating said instrument shaft whereby the portion of said stub tube within said vessel can be scanned by said inspection instrument.

* * * * *